(12) United States Patent
Starner et al.

(10) Patent No.: US 8,766,940 B1
(45) Date of Patent: Jul. 1, 2014

(54) TEXTURED LINEAR TRACKPAD

(75) Inventors: Thad E. Starner, Mountain View, CA (US); Maj Isabelle Olsson, Mountain View, CA (US); Matthew Martin, Mountain View, CA (US); Nirmal J. Patel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 13/454,275

(22) Filed: Apr. 24, 2012

Related U.S. Application Data

(60) Provisional application No. 61/584,206, filed on Jan. 6, 2012.

(51) Int. Cl.
*G06F 3/041* (2006.01)

(52) U.S. Cl.
USPC .......................................... 345/173; 345/174

(58) Field of Classification Search
CPC ................................. G06F 3/041; G06F 3/045
USPC ........................................ 345/173, 174, 156
See application file for complete search history.

(56) References Cited

U.S. PATENT DOCUMENTS

| | | | |
|---|---|---|---|
| 6,252,579 B1 * | 6/2001 | Rosenberg et al. | 715/856 |
| 7,038,659 B2 * | 5/2006 | Rajkowski | 345/156 |
| 7,884,802 B2 * | 2/2011 | Yoshioka | 345/169 |
| 8,390,569 B2 * | 3/2013 | Stenmark et al. | 345/157 |
| 8,506,080 B2 * | 8/2013 | Raffle et al. | 351/209 |
| 8,610,684 B2 * | 12/2013 | Kalu et al. | 345/173 |
| 8,631,350 B2 * | 1/2014 | Lepage et al. | 715/810 |
| 8,645,566 B2 * | 2/2014 | Anderson et al. | 709/236 |

* cited by examiner

*Primary Examiner* — Ricardo L Osorio
(74) *Attorney, Agent, or Firm* — McDonnell Boehnen Hulbert & Berghoff LLP (57) ABSTRACT

A computing device includes a trackpad, which includes a touch-sensitive surface having a touch-detectable pattern. The touch-detectable pattern includes a first feature, and a second feature having first and second side features. The first and second side features start in proximity of the first feature and are positioned on opposite sides of the first feature.

20 Claims, 10 Drawing Sheets

TEXTURED LINEAR TRACKPAD

RELATED APPLICATIONS

This application claims priority to U.S. Provisional Patent Application Ser. No. 61/584,206, entitled "Textured Linear Trackpad," filed on Jan. 6, 2012, which is incorporated herein by reference in its entirety.

BACKGROUND

Unless otherwise indicated herein, the materials described in this section are not prior art to the claims in this application and are not admitted to be prior art by inclusion in this section.

Though battery life, keyboard, and processing power are all very important parts of a laptop experience, a touch pad or trackpad has also proven to be an important element of a mobile PC. These tiny slabs, made of plastic, metal, or glass, are responsible for navigating everything from Web site buttons to document creation to photo editing.

Whether lounging on a couch or sitting at an airport or coffee shop, the trackpad is relied upon and used to replicate the wide variety of movements and tasks associated with the traditional mouse.

However, a conventional trackpad does not convey to the user through touch information about the location of his/her finger without having to look away from the associated display screen.

SUMMARY

Disclosed herein are improved methods, systems, and devices for matching gesture keyboard strokes with predefined stroke templates.

In one embodiment, a computing device includes a trackpad, which includes a touch-sensitive surface having a touch-detectable pattern. The touch-detectable pattern includes a first feature and a second feature having first and second side features. The first and second side features start in proximity of the first feature and are positioned on opposite sides of the first feature.

In another embodiment, a head-wearable display device includes a trackpad positioned on the display device and configured to generate a signal generated by a touch point on the trackpad, wherein the trackpad comprises a touch-sensitive surface having a touch-detectable pattern. The touch-detectable pattern includes a first feature and a second feature having first and second side features. The first and second side features start in proximity of the first feature and are positioned on opposite sides of the first feature. The head-wearable display device further includes a processor coupled to the trackpad, and a memory unit for storing program instructions executable by the processor to determine a location of the touch point on the trackpad based on the generated signal.

These as well as other aspects, advantages, and alternatives will become apparent to those of ordinary skill in the art by reading the following detailed description, with reference where appropriate to the accompanying drawings. Further, it should be understood that this summary section and the rest of this document are intended to discuss the provided disclosure by way of example only and not by way of limitation.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

When using a typical touchpad, touchscreen or trackpad as an input device, an input space is conserved. Unlike a mouse, the trackpad is not moved around in order to manipulate a cursor on a display screen. Instead, a finger or stylus is moved across a touch-sensitive surface, while the trackpad advantageously remains stationary. However, without looking at the typical trackpad, the user may not be aware of the location of his/her finger on the touchpad. While manipulating a position of a cursor on the display screen, the user is typically concentrating on watching the display and not the touchpad. A touch-surface of the trackpad is typically uniformly smooth to the perception of the human touch, and does not provide any tactile indication to assist the user in determining where his/her finger is on the touchpad.

In the context of a wearable computing system having a head-mounted display (HMD) with a side-mounted touch-screen interface, the trackpad is generally located on a side of the wearer's head when the HMD is worn. Because of this arrangement, some wearers may have difficulty orienting their finger on the trackpad. Accordingly, in an exemplary embodiment, this orientation difficulty is alleviated by providing the touchscreen with a textured linear trackpad, which includes a raised or indented pattern that give the wearer a haptic sense of where his/her finger is located on the trackpad. Moreover, in some example embodiments, the pattern may be such that it provides an indication of: (a) when the wearer's finger is at the center of the trackpad, (b) when the wearer's finger is located to the right or left of the center, and/or (c) a horizontal distance from the wearer's finger to the center.

Figure 1:
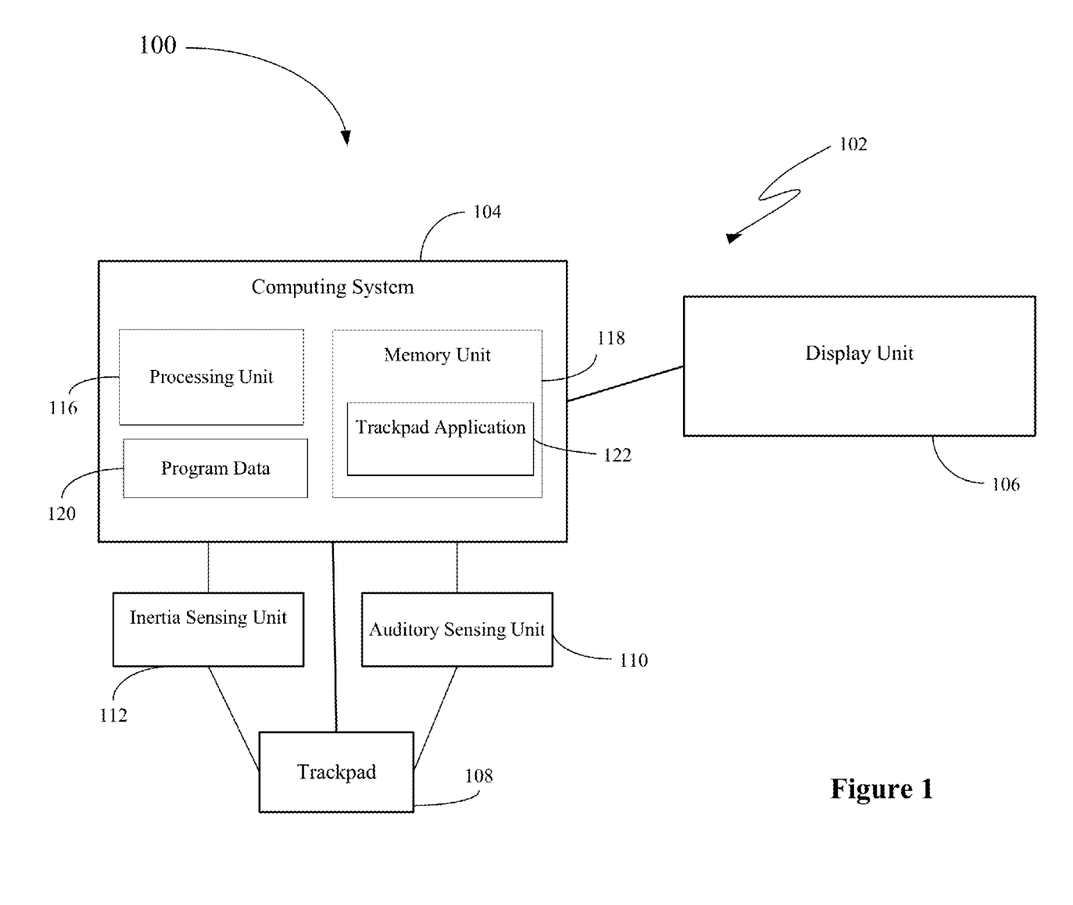
FIG. 1 is a schematic diagram of one example embodiment of a computing system including a trackpad.

Now referring to FIG. 1, an example embodiment 100 of a computing system 102 is illustrated. Computing system 102 includes a computing unit 104, a display unit 106, a touch-sensitive positioning device or trackpad 108, an auditory sensing unit 110, and a motion sensing unit 112. Trackpad 108 includes a position sensing surface, which is configured to sense a position of a pointing object, such as a user's finger, which is manipulated by the user. Display unit 106 is configured to present to the user, based on corresponding inputs, texts and images, and upon which a cursor is located. Computing unit 104 includes a processing unit 116, a memory unit 118, and a program data module 120. Memory unit 118 includes a trackpad application 122, which is configured to determine a position of a user's finger on trackpad 108 based on contact data received from trackpad 108.

Figure 2:
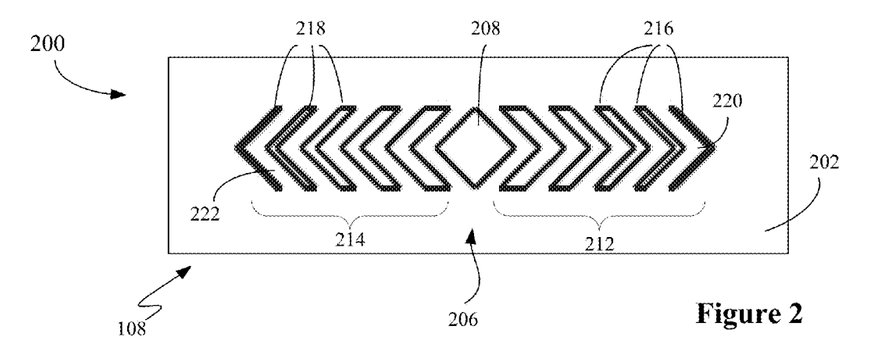
FIG. 2 is a top view of a schematic diagram of an example embodiment of a textured trackpad.

Now referring to FIG. 2, an example embodiment 200 of trackpad 108 is illustrated. Trackpad 108 includes a touch-sensitive surface 202, which in turn includes two distinct components. The first component includes a generally planar surface 204 and the second component includes a textured pattern 206. Planar surface 204 may have a substantially uniform smooth pattern, which provides minimal tactile indication to assist the user in determining where his/her finger is on trackpad 108. Textured pattern 206 is configured to include a raised or indented contact surface having a geometry that helps the user, while not looking at trackpad 108, distinguish between which areas of trackpad 108 his/her finger is in contact with, thereby providing a substantially quick sense of where his/her finger is on trackpad 108.

Moreover, the textured pattern geometry is also configured to provide the user upon minimal movement or gesture on trackpad 108, with substantial accuracy, whether his/her finger is located to the right or left of the center of trackpad 108, as well as a horizontal distance of between his/her finger and the trackpad's center.

In one embodiment, although texture pattern 206 is touchably detectable to the user, it may not be visually detectable. As such, while looking at trackpad 108, the user may not notice textured pattern 206 unless his/her finger is in contact with it.

In one embodiment, the surface texture of trackpad 108 may vary around trackpad 108, thereby providing perceivably different textures to the user. For example, the materials used to form pattern 206 may vary from one material having a substantially smooth surface at one longitudinal end of trackpad 108 to another material having a rubberized surface at an opposite longitudinal end of trackpad 108. Alternately, the substantially smooth surface may be around the center of trackpad 108 and become more rubberized as a distance from the trackpad center increases. In another embodiment, a plurality of different textures may be formed or printed on textured pattern 206.

As shown in the example embodiment 200 of FIG. 2, texture pattern 206 includes a diamond shaped first feature 208 that may be located at or substantially near the center of trackpad 106. Further, textured pattern 206 includes a second feature, which in turn includes first and second side features 212 and 214 located to the right and to the left of diamond shaped first feature 208, respectively. First and second side features 212 and 214 are configured to touchably provide a corresponding direction of textured pattern 206 on either side of diamond shaped first feature 208, thereby being indicative of which side of diamond shaped first feature 208 the user is touching.

As shown in FIG. 2, first and second side features 212 and 214 include protruding ridges or recessed depressions 216 and 218, respectively. For first side feature 212, each of its ridges or depressions 216 is shaped as a horizontally directed letter V pointing to one longitudinal end 213 of trackpad 106. For second side feature 214, each of its ridges or depressions is shaped as a horizontally directed letter V pointing to an opposite longitudinal end 215 of trackpad 106.

Further, a thickness of each of ridges or depressions 216 and 218 of textured pattern 206 may decrease the further the respective ridge or depression is from centrally located diamond shaped first feature 208. Thus, in addition to a position or movement direction of the user's finger, the changing thickness of ridges or depressions 216 and 218 may enable the user to quickly get sense of how far his/her finger is from diamond shaped first feature 208, i.e., from the center of trackpad 106. Additionally, a gap 220 and 222, which separates adjacent ridges or depressions 216 and 218, respectively, may also have a changing width as its distance from diamond shaped first feature 208 changes.

In another embodiment, in order to further enable the user to quickly touchably determine or sense which side of diamond shaped first feature 208 his/her finger is positioned on trackpad 106, first side feature 212 may only include protruding ridges, while second side feature 214 may only include recessed or indented depressions.

As discussed above in regard to FIG. 1, computing system 104 includes auditory sensing unit 110 and motion sensing unit 112, both of which are configured to detect or sense respective motion and audio signals generated by the user's finger moving on textured pattern 206. Computing system 104 is configured to supplement position data determined by trackpad application with mechanical vibrations or signals and audio signals generated by the user dragging his/her finger on textured pattern 206 and detected or sensed by motion sensing unit 112 and auditory sensing unit 110, respectively. In one embodiment, auditory sensing unit 110 may be a "piezo" microphone, and motion sensing unit 112 may include at least one of an accelerometer or a gyroscope. Additionally, auditory sensing unit 110 and motion sensing unit 112 may be any other suitable sensing units.

Moreover, in order to maintain auditory sensing unit 110 and motion sensing unit 112 free of errors accumulated during operating sessions of trackpad 106, auditory sensing unit 110 and motion sensing unit 112 are recalibrated whenever trackpad 106 is turned on. As known, accumulated errors may lead to a drift into measurements of the respective mechanical and audio signals, which can translate into an ever-increasing gap between estimated mechanical and signal values and actual mechanical and signal values.

In one embodiment, data received from auditory sensing unit 110 and/or motion sensing unit 112 may also serve to minimize any ghosting issues affecting computing unit 104 while converting contact data received from trackpad 106 into position data on trackpad 106. Moreover, data provided by auditory sensing unit 110 and motion sensing unit 112 may help computing unit 104 determine whether contact data received from trackpad 106 correspond to unintended or false contact with or touches on trackpad 106.

Figure 3:
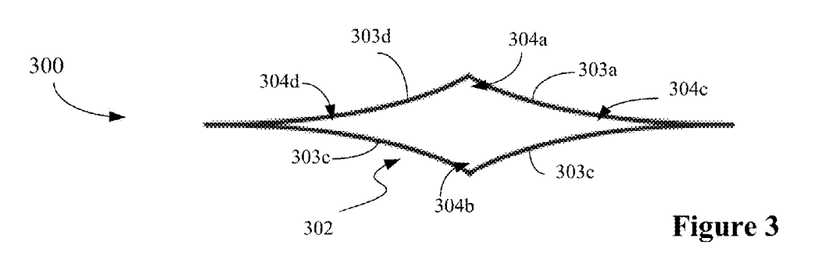
FIG. 3 is a top view of a schematic diagram of an example embodiment of a textured trackpad.

Now referring to FIG. 3, an example embodiment 300 of a textured pattern 302 is illustrated. As shown, textured pattern 302 includes a raised or indented longitudinally stretched diamond shaped figure. Textured pattern 302 has four curved sides 303a-303d and four pointed areas 304a-304d. Alternatively, one or more of four curved sides connected 303a-303d may be replaced by a straight line. As such, textured pattern 402 includes a first feature including pointed areas 304a and 304b, with area 304a pointing up and area 304b pointing down. Further, textured pattern 302 includes a second feature formed of two longitudinally narrowing and oppositely oriented first and second areas 304c and 304d, extending from the first feature.

Figure 4:
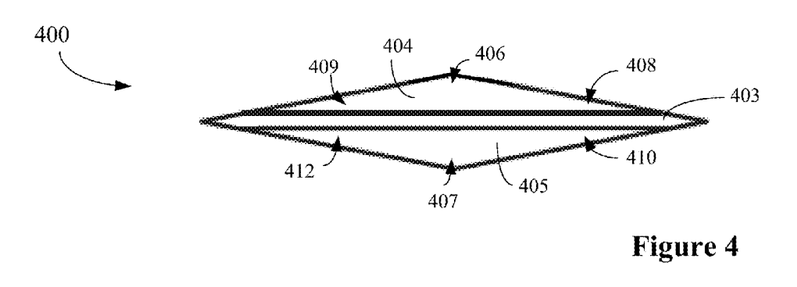
FIG. 4 is a top view of a schematic diagram of an example embodiment of a textured trackpad.

Now referring to FIG. 4, an example embodiment 400 of a textured pattern 402 is illustrated. As shown, textured pattern 402 includes raised or indented triangularly shaped components 404 and 405, which are substantially mirror images of each other with respect to a longitudinal gap 403 that separates them. Textured pattern 402 includes a first feature formed of pointed areas 406 and 407, associated with triangularly shaped components 404 and 405, respectively, with area 406 pointing up and area 407 pointing down. Further, each of components 404 and 405 includes two longitudinally narrowing and oppositely oriented first and second areas 408-409 and 410-412, respectively, thereby forming a second feature extending from the first feature.

Figure 5:
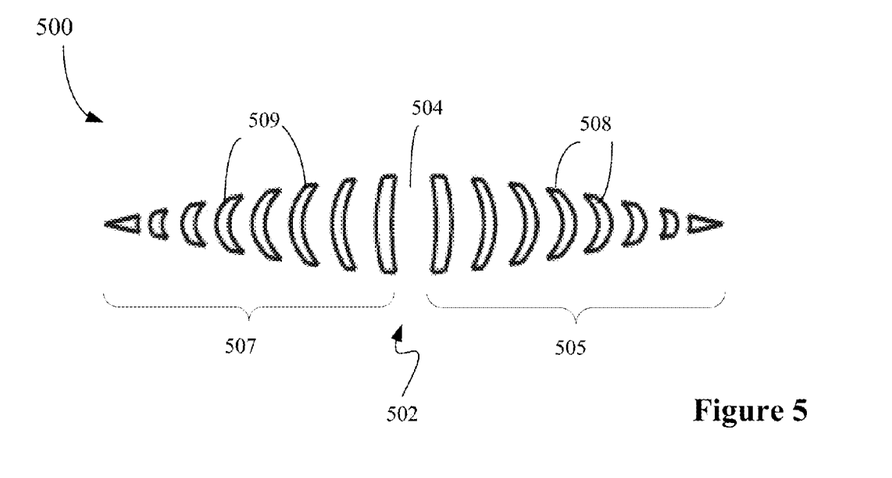
FIG. 5 is a top view of a schematic diagram of an example embodiment of a textured trackpad.

Now referring to FIG. 5, an example embodiment 500 of a textured pattern 502 is illustrated. As shown, textured pattern 502 includes a smooth surface area (first feature) 504 located at a substantial central location of trackpad 106. First feature 504 is sandwiched longitudinally by a second feature that includes two sets of arced raised ridges or indented depressions (first and second side features, respectively) 505 and 507. The two sets of ridges or depressions 505 and 507 include elements 508 and 509, respectively, which decrease in arc lengths along a width of trackpad 106 as a distance between them and first feature 504 increases. Additionally, arc angles (not shown) of elements 508 and 509 may decrease as a distance between elements 508 and 509 and first feature 504 increases. In one embodiment, first side feature 505 may include arced raised ridges while second side feature 507 may include arced indented depressions, or vice-versa.

Figure 6:
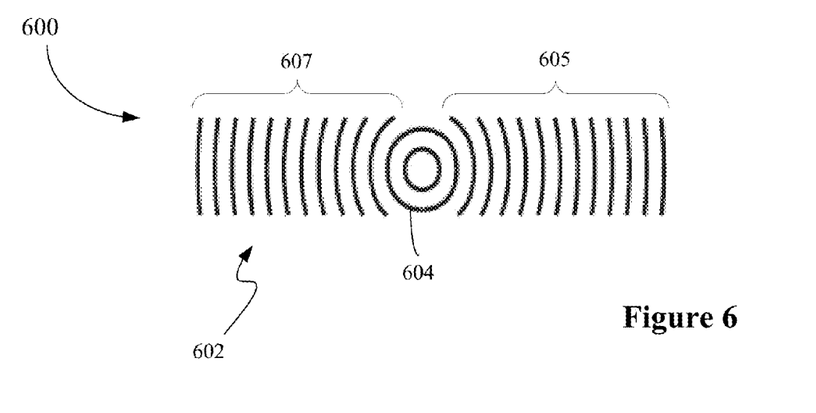
FIG. 6 is a top view of a schematic diagram of an example embodiment of a textured trackpad.

Now referring to FIG. 6, an example embodiment 600 of a textured pattern 602 is illustrated. As shown, textured pattern 1602 includes a first feature 604 formed of two concentric circular raised ridges or indented depressions, situated substantially centrally on trackpad 106. From feature 604 extends a second feature formed of raised ridges or indented depressions 605 and 607 that are arc shaped in proximity of first feature 1604 and get progressively straighter as a distance between them and first feature 604 increases. Raised ridges or indented depressions 605 extend from one side of feature 604, while raised ridges or indented depressions 607 extend from another side of feature 604.

Figure 7:
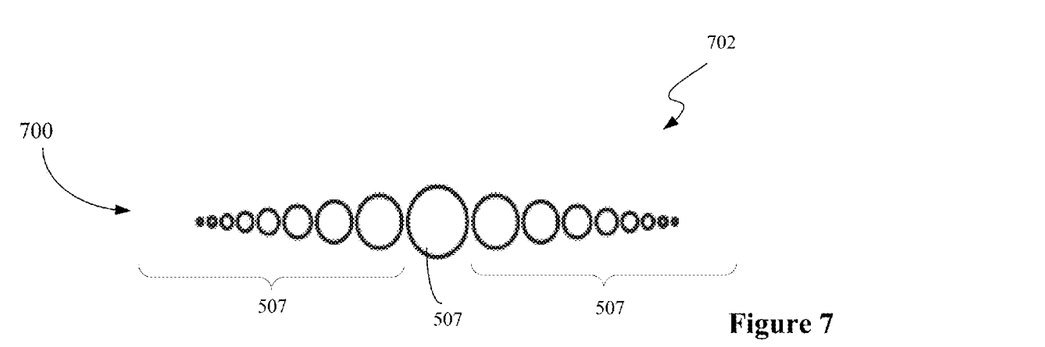
FIG. 7 is a top view of a schematic diagram of an example embodiment of a textured trackpad.

Now referring to FIG. 7, an example embodiment 700 of a textured pattern 702 is illustrated. As shown, textured pattern 702 includes a first feature 704 formed of one circular shaped raised ridge or indented depression, situated substantially centrally on trackpad 106. From feature 704 extends a second feature formed of circular raised ridges or indented depressions 705 and 707 that get progressively smaller in radius as a distance between them and first feature 704 increases. Circular raised ridges or indented depressions 705 (first side feature) extend from one side of feature 704, while circular raised ridges or indented depressions 707 (second side feature) extend from another side of feature 704.

Figure 8:
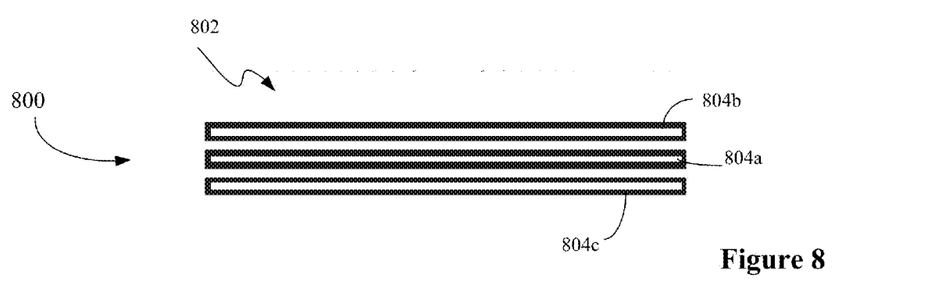
FIG. 8 is a top view of a schematic diagram of an example embodiment of a textured trackpad.

Now referring to FIG. 8, an example embodiment 800 of a textured pattern 802 is illustrated. As shown, textured pattern 802 includes three longitudinally oriented raised ridges 804a-804c. In one embodiment, as shown, longitudinal raised ridges 804a-804c are distinguishable from one another because their different widths, thereby providing the user a quick indication of where his/her finger is in contact with trackpad 106 relative a longitudinal middle of trackpad 106. In another embodiment, textured pattern 802 may include longitudinally oriented indented depressions. As shown, each of raised ridges 804a-804c has a substantially rectangular shape. Alternatively, longitudinal raised ridges 804a-804c may have a longitudinally narrowing shape.

Figure 9:
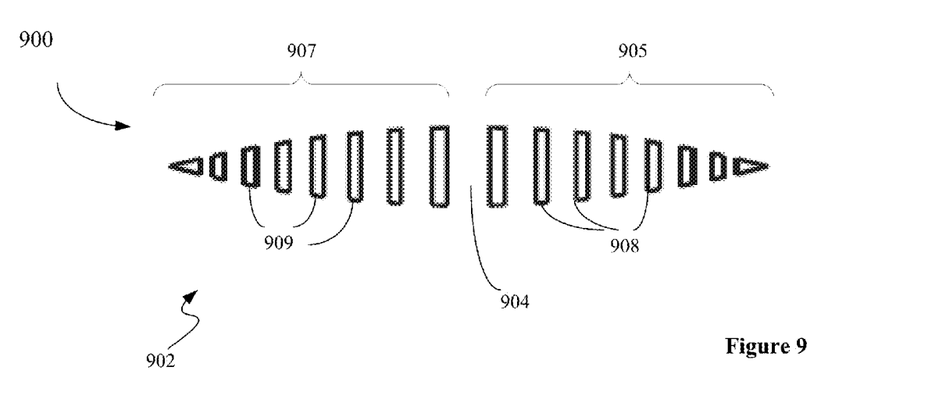
FIG. 9 is a top view of a schematic diagram of an example embodiment of a textured trackpad.

Now referring to FIG. 9, an example embodiment 900 of a textured pattern 902 is illustrated. As shown, textured pattern 902 includes a smooth surface area (first feature) 904 located at a substantial central location of trackpad 106. First feature 904 is sandwiched longitudinally by a second feature that includes two sets of straight raised ridges or indented depressions (first and second side features) 905 and 907. The two sets of ridges or depressions 905 and 907 include elements 908 and 909, respectively, which decrease in lengths along a width of trackpad 106 as a distance between them and first feature 904 increases. Additionally, the two sets of ridges or depressions 905 and 907 may increase or decrease in thickness as a distance between them and first feature 904 increases. In one embodiment, first side feature 905 may include straight raised ridges while second side feature 907 may include straight indented depressions, or vice-versa.

Figure 10:
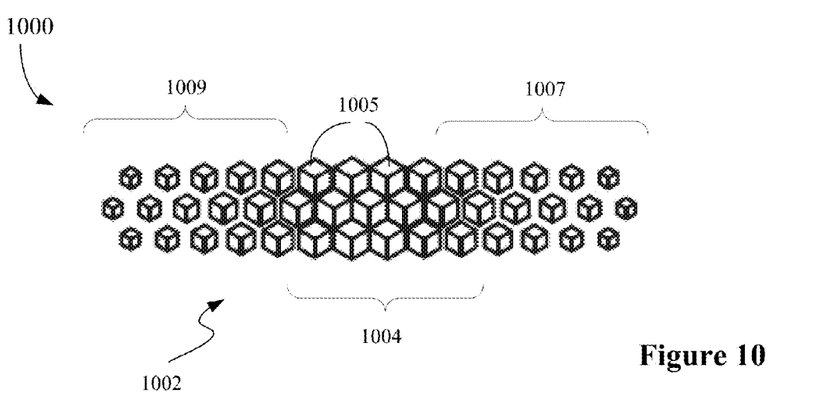
FIG. 10 is a top view of a schematic diagram of an example embodiment of a textured trackpad.

Now referring to FIG. 10, an example embodiment 1000 of a textured pattern 1002 is illustrated. As shown, textured pattern 1002 includes a first feature 1004 located at a substantial central location of trackpad 106, and formed of compactly arranged cube shaped elements 1005. From first feature 1004 extends a second feature that includes two sets of non-touching cube shaped elements 1007 and 1009, respectively. The two sets of non-touching cube shaped elements 1007 and 1009 decrease in size as a distance between them and first feature 1004 increases. Additionally, adjacent non-touching cube shaped elements 1007 and 1009 become more distant from one another as the distance between them and first feature 1004 increases.

Figure 11:
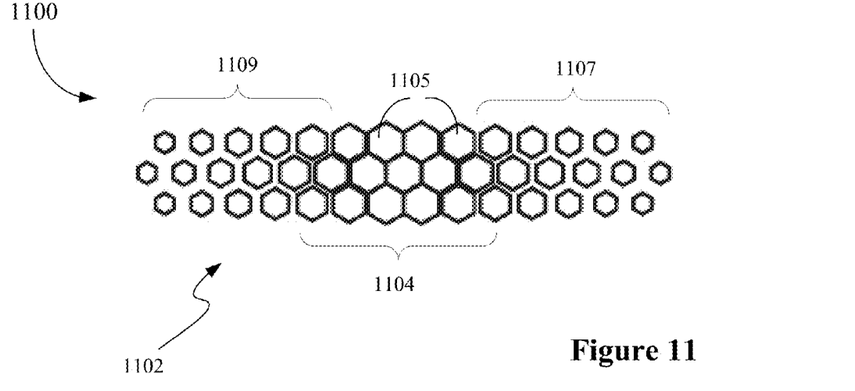
FIG. 11 is a top view of a schematic diagram of an example embodiment of a textured trackpad.

Now referring to FIG. 11, an example embodiment 1100 of a textured pattern 1102 is illustrated. As shown, textured pattern 1102 includes a first feature 1104 located at a substantial central location of trackpad 106, and formed of compactly arranged hexagonally shaped elements 1105. From first feature 1104 extends a second feature 1106 that includes two sets of non-touching hexagonally shaped elements 1107 and 1109, respectively. The two sets of non-touching cube shaped elements 1107 and 1109 decrease in size as a distance between them and first feature 1104 increases. Additionally, adjacent non-touching cube shaped elements 1107 and 1109 become more distant from one another as the distance between them and first feature 1104 increases.

Example System and Device Architecture

Figure 12:
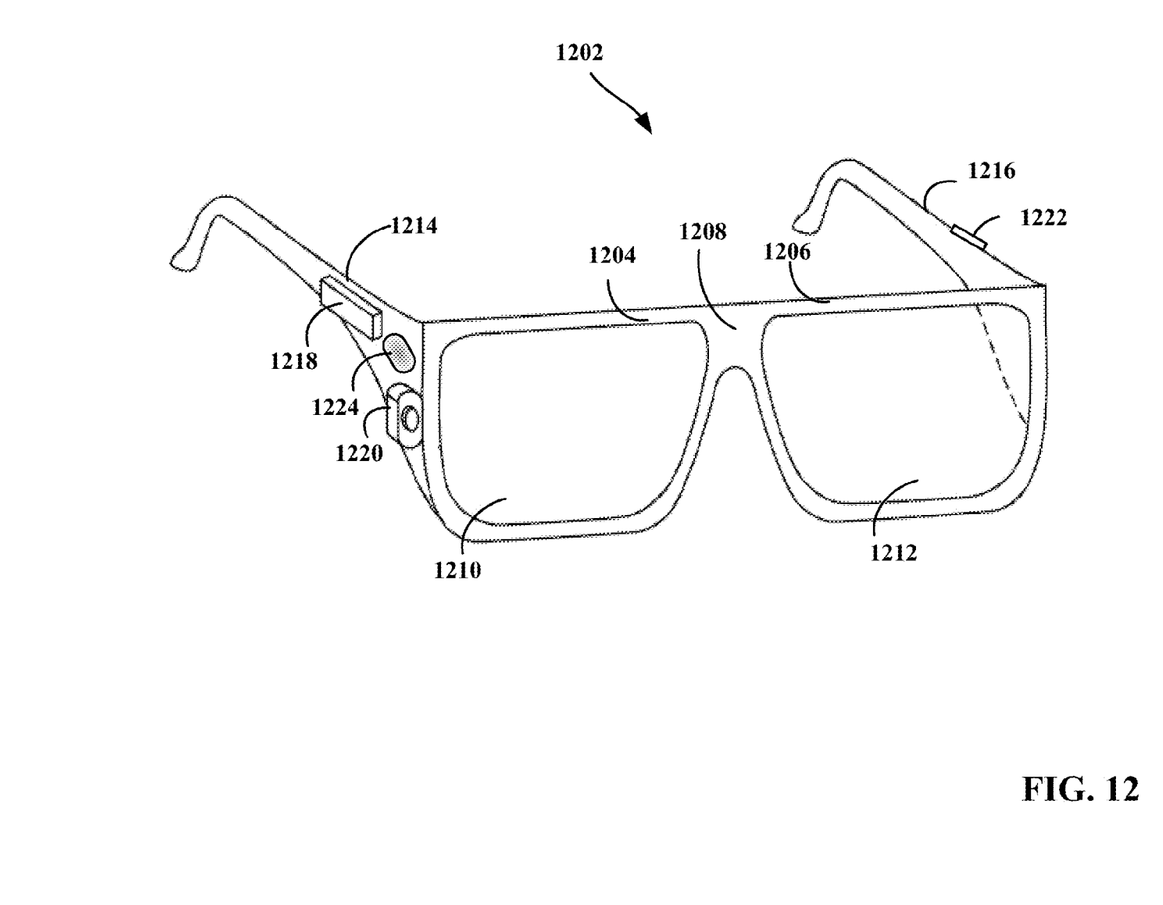
FIG. 12 illustrates a wearable computing system according to an exemplary embodiment.

FIG. 12 illustrates a wearable computing system according to an example embodiment. In FIG. 12, the wearable computing system takes the form of a head-mounted device (HMD) 1202 (which may also be referred to as a head-mounted display). It should be understood, however, that example systems and devices may take the form of or be implemented within or in association with other types of devices, without departing from the scope of the invention. As illustrated in FIG. 12, head-mounted device 1202 comprises frame elements including lens-frames 1204, 1206 and a center frame support 1208, lens elements 1210, 1212, and extending side-arms 1214, 1216. Center frame support 1208 and extending side-arms 1214, 1216 are configured to secure head-mounted device 1202 to a user's face via a user's nose and ears, respectively.

Each of frame elements 1204, 12012, and 1208 and extending side-arms 1214, 1216 may be formed of a solid structure of plastic and/or metal, or may be formed of a hollow structure of similar material so as to allow wiring and component interconnects to be internally routed through head-mounted device 1202. Other materials may be possible as well.

One or more of each of lens elements 1210, 1212 may be formed of any material that can suitably display a projected image or graphic. Each of lens elements 1210, 1212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

Extending side-arms 1214, 1216 may each be projections that extend away from lens-frames 1204, 1206, respectively, and may be positioned behind a user's ears to secure head-mounted device 1202 to the user. Extending side-arms 1214, 1216 may further secure head-mounted device 1202 to the user by extending around a rear portion of the user's head. Additionally or alternatively, for example, HMD 1202 may connect to or be affixed within a head-mounted helmet structure. Other possibilities exist as well.

HMD 1202 may also include an on-board computing system 1218, a video camera 1220, a sensor 1222, and a finger-operable touch pad 1224. On-board computing system 1218 is shown to be positioned on extending side-arm 1214 of head-mounted device 1202; however, on-board computing system 1218 may be provided on other parts of head-mounted device 1202 or may be positioned remote from head-mounted device 1202 (e.g., on-board computing system 1218 could be wire- or wirelessly-connected to head-mounted device 1202). On-board computing system 1218 may include a processor and memory, for example. On-board computing system 1218 may be configured to receive and analyze data from video camera 1220, finger-operable touch pad 1224, and possibly from other sensory devices, user interfaces, or both) and generate images for output by lens elements 1210 and 1212.

Video camera 1220 is shown positioned on extending side-arm 1214 of head-mounted device 102; however, video camera 1220 may be provided on other parts of head-mounted device 1202. Video camera 1220 may be configured to capture images at various resolutions or at different frame rates. Many video cameras with a small form-factor, such as those used in cell phones or webcams, for example, may be incorporated into an example of HMD 1202.

Further, although FIG. 12 illustrates one video camera 1220, more video cameras may be used, and each may be configured to capture the same view, or to capture different views. For example, video camera 1220 may be forward facing to capture at least a portion of the real-world view perceived by the user. This forward facing image captured by video camera 1220 may then be used to generate an augmented reality where computer generated images appear to interact with the real-world view perceived by the user.

Sensor 1222 is shown on extending side-arm 1216 of head-mounted device 1202; however, sensor 1222 may be positioned on other parts of head-mounted device 1202. Sensor 1222 may include one or more of a gyroscope or an accelerometer, for example. Other sensing devices may be included within, or in addition to, sensor 1222 or other sensing functions may be performed by sensor 1222.

Finger-operable touch pad 1224 is shown on extending side-arm 1214 of head-mounted device 1202. However, finger-operable touch pad 1224 may be positioned on other parts of head-mounted device 1202. Also, more than one finger-operable touch pad may be present on head-mounted device 1202. Finger-operable touch pad 1224 may be used by a user to input commands. Finger-operable touch pad 1224 may sense at least one of a position and a movement of a finger via capacitive sensing, resistance sensing, or a surface acoustic wave process, among other possibilities. Finger-operable touch pad 1224 may be capable of sensing finger movement in a direction parallel or planar to the pad surface, in a direction normal to the pad surface, or both, and may also be capable of sensing a level of pressure applied to the pad surface. Finger-operable touch pad 1224 may be formed of one or more translucent or transparent insulating layers and one or more translucent or transparent conducting layers. Edges of finger-operable touch pad 124 may be formed to have a raised, indented, or roughened surface, so as to provide tactile feedback to a user when the user's finger reaches the edge, or other area, of finger-operable touch pad 1224. If more than one finger-operable touch pad is present, each finger-operable touch pad may be operated independently, and may provide a different function.

Figure 13:
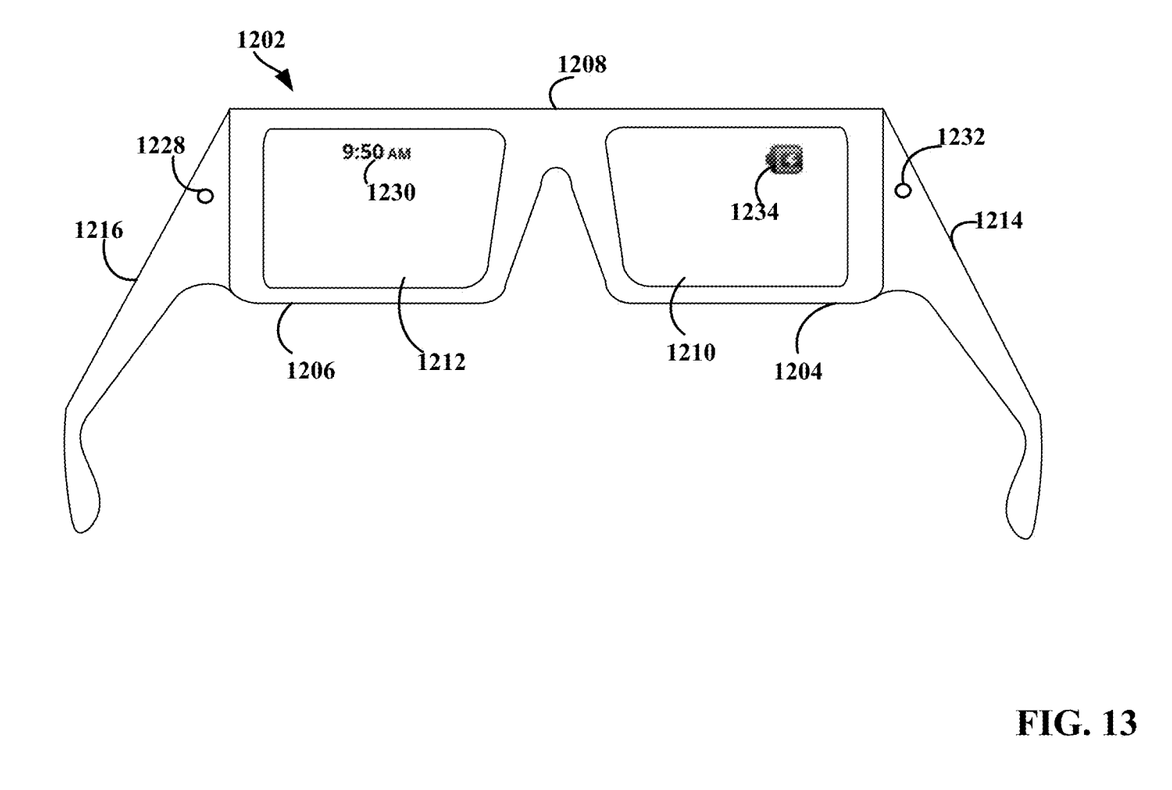
FIG. 13 illustrates an alternate view of the wearable computing device illustrated in FIG. 12.

FIG. 13 illustrates an alternate view of the wearable computing device illustrated in FIG. 12. As shown in FIG. 13, lens elements 1210, 1212 may act as display elements. Head-mounted device 1202 may include a first projector 1228 coupled to an inside surface of extending side-arm 1216 and configured to project a display 1230 onto an inside surface of lens element 1212. Additionally or alternatively, a second projector 1232 may be coupled to an inside surface of extending side-arm 1214 and configured to project a display 1234 onto an inside surface of the lens element 1210.

Lens elements 1210, 1212 may act as a combiner in a light projection system and may include a coating that reflects the light projected onto them from projectors 1228, 1232. In some embodiments, a reflective coating may not be used (e.g., when the projectors 1228, 1232 are scanning laser devices).

In alternative embodiments, other types of display elements may also be used. For example, lens elements 1210, 1212 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within frame elements 1204, 1206 for driving such a matrix display. Alternatively or additionally, a laser or LED source and scanning system could be used to draw a raster display directly onto the retina of one or more of the user's eyes. Other possibilities exist as well.

Figure 14:
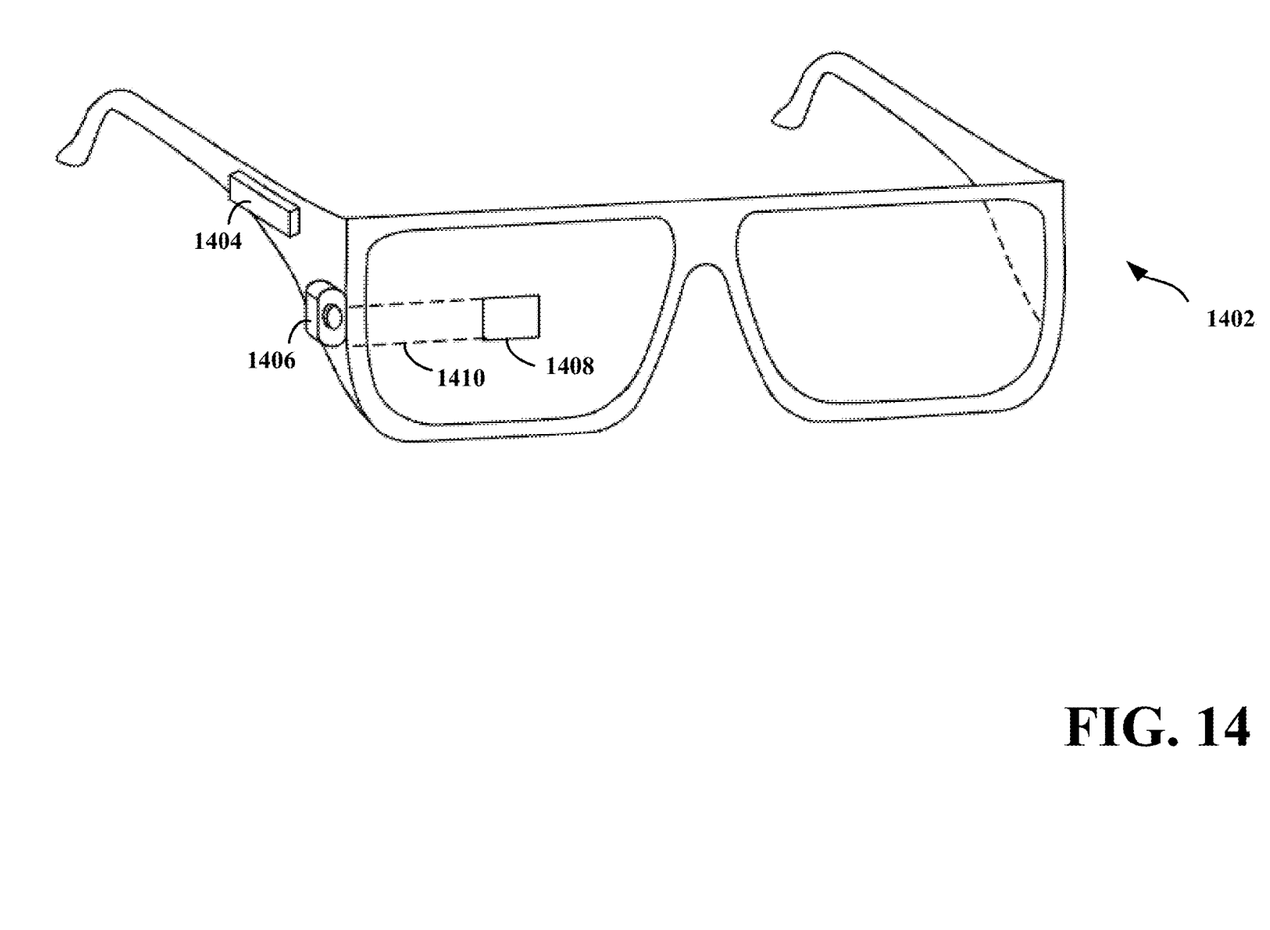
FIG. 14 illustrates another wearable computing system according to an exemplary embodiment.

FIG. 14 illustrates another wearable computing system according to an example embodiment, which takes the form of an HMD 1402. HMD 1402 may include frame elements and side-arms such as those described with respect to FIGS. 12 and 13. HMD 1402 may additionally include an on-board computing system 1404 and a video camera 1406, such as those described with respect to FIGS. 12 and 13. Video camera 1406 is shown mounted on a frame of HMD 1402. However, video camera 1406 may be mounted at other positions as well.

As shown in FIG. 14, HMD 1402 may include a single display 1408 which may be coupled to the device. Display 1408 may be formed on one of the lens elements of HMD 1402, such as a lens element described with respect to FIGS. 12 and 13, and may be configured to overlay computer-generated graphics in the user's view of the physical world. Display 1408 is shown to be provided in a center of a lens of HMD 1402; however, display 1408 may be provided in other positions. Display 1408 is controllable via computing system 1404 that is coupled to display 1408 via an optical waveguide 1410.

Figure 15:
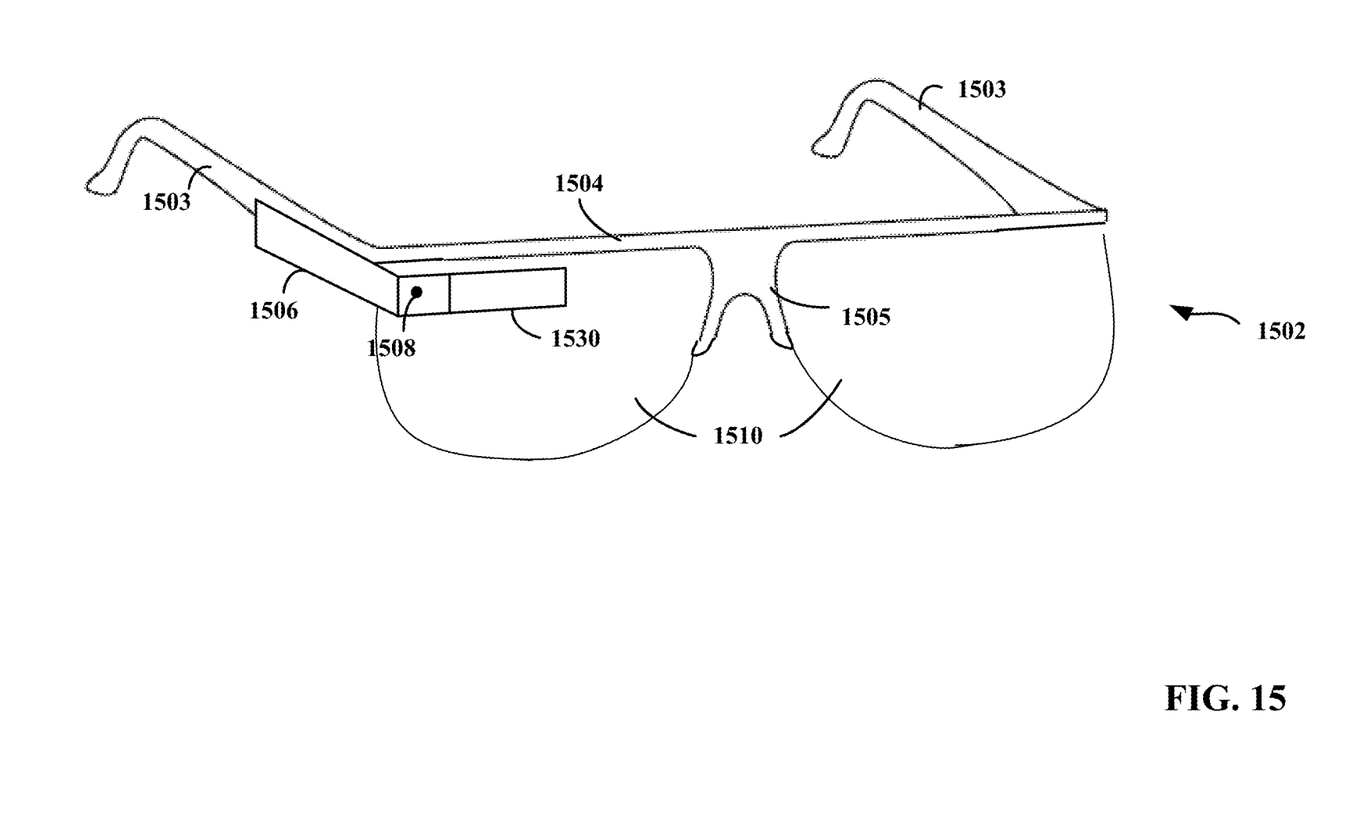
FIG. 15 illustrates another wearable computing system according to an exemplary embodiment.

FIG. 15 illustrates another wearable computing system according to an example embodiment, which takes the form of an HMD 1502. HMD 1502 may include side-arms 1503, a center frame support 1504, and a bridge portion with nosepiece 1505. In the example shown in FIG. 15, the center frame support 1504 connects the side-arms 1503. HMD 1502 may additionally include an on-board computing system 1506, a video camera 1508, such as those described with respect to FIGS. 12 and 13.

HMD 1502 may include lens elements 1510 that may be coupled to one of the side-arms 1503 or the center frame support 1504. At least one of lens element 1510 may include a display such as the display described with reference to FIGS. 12 and 13, and may be configured to overlay computer-generated graphics upon the user's view of the physical world. In one example, each of lens elements 1510 may be coupled to the inner side (i.e., the side exposed to a portion of a user's head when worn by the user) of one of extending side-arms 1503. Lens element 1510 may be positioned in front of or proximate to a user's eye when HMD 1502 is worn by the user.

Figure 16:
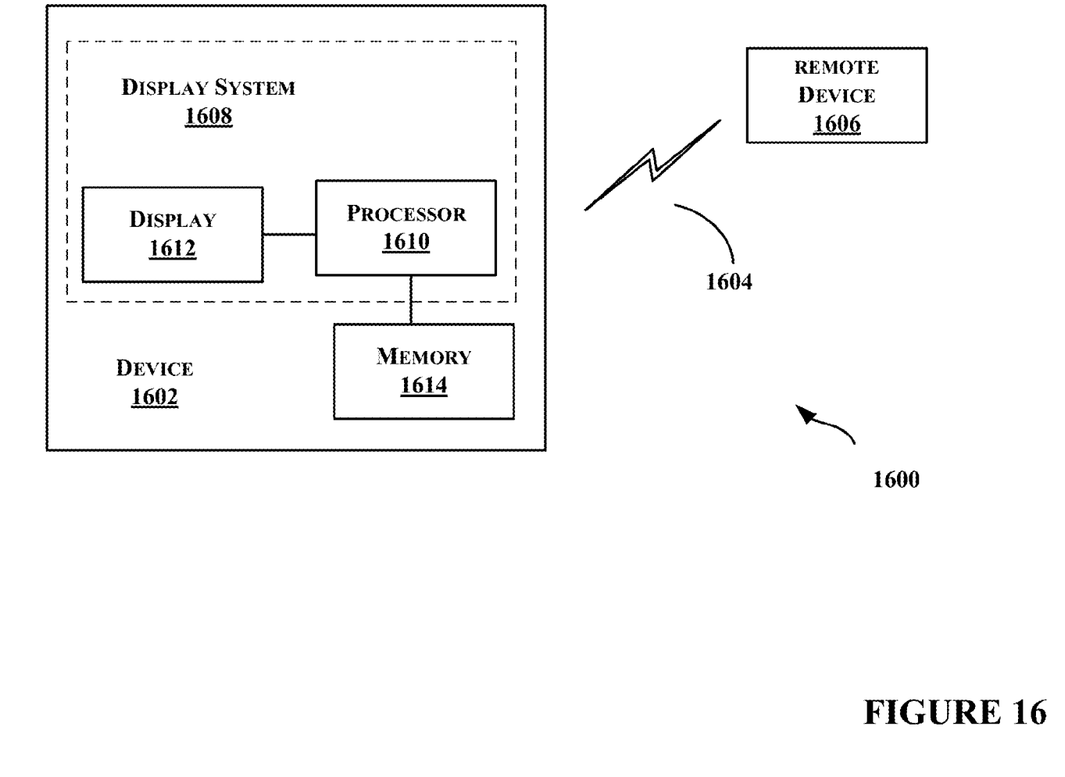
FIG. 16 illustrates a schematic drawing of a computing device according to an exemplary embodiment.

FIG. 16 illustrates a simplified block diagram of an example computer-network infrastructure. In one system 1600, a device 1602 communicates using a communication link 1604 (e.g., a wired or wireless connection) to a remote device 16012. Device 1602 may be any type of device that can receive data and display information corresponding to or associated with the data.

Thus, device 1602 may include display system 1608 comprising a processor 1610 and a display 1612. Display 212 may be, for example, an optical see-through display, an optical see-around display, or a video see-through display. Processor 1610 may by any type of processor, such as a microprocessor or a digital signal processor, for example. Device 1602 may further include on-board data storage, such as memory 1614 coupled to processor 1610. Memory 1614 may store software that can be accessed and executed by processor 1610, for example.

Remote device 1612 may be any type of computing device or transmitter including a laptop computer, a mobile telephone, a network server, etc., that is configured to transmit data to device 1602. Remote device 1612 and device 1602 may contain hardware to enable communication link 1604, such as processors, transmitters, receivers, antennas, etc.

In FIG. 16, communication link 1604 is illustrated as a wireless connection; however, wired connections may also be used. For example, communication link 1604 may be a wired link via a serial bus such as a universal serial bus or a parallel bus. Such a wired connection may be a proprietary connection as well. Communication link 1604 may also be a wireless connection that uses, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Remote device 16012 may be accessible via the Internet and may comprise a computing cluster associated with a particular web service (e.g., social-networking, photo sharing, address book, etc.).

In an example embodiment, device 1602 may include a system bus (not shown) that communicatively connects processor 1610 and memory 1614, as well as other components of device 1602. Depending on the desired configuration, processor 1610 can be any type of processor including, but not limited to, a microprocessor (μP), a microcontroller (μC), a digital signal processor (DSP), or any combination thereof. Furthermore, memory 1014 can be of any type of memory now known or later developed including but not limited to volatile memory (such as RAM), non-volatile memory (such as ROM, flash memory, etc.) or any combination thereof.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A computing device comprising:
   a display screen; and
   a trackpad in communication with the display screen, wherein the trackpad comprises:
     a touch-sensitive surface having a touch-detectable pattern, wherein the touch-detectable pattern comprises:
       a first feature, and
       a second feature having first and second side features, wherein the first and second side features start in proximity of the first feature and are positioned on opposite sides of the first feature.

2. The computing device of claim 1, wherein a portion of the touch-sensitive surface that surrounds the touch-detectable pattern is formed of a smooth material.

3. The computing device of claim 1, wherein the touch-detectable pattern comprises a textured surface.

4. The computing device of claim 1, wherein the first feature of the touch-detectable pattern comprises a first textured surface, and the second feature of the touch-detectable pattern comprises a second textured surface.

5. The computing device of claim 1, wherein the first feature is substantially centrally located on the touch sensitive surface.

6. The computing device of claim 1, wherein the first feature includes a substantially smooth surface.

7. The computing device of claim 1, wherein the first feature includes a rubberized surface.

8. The computing device of claim 1, wherein the first and second side features include a rubberized surface.

9. The computing device of claim 1, wherein the first and second side features start in proximity of the first feature and change progressively along a respective direction away from the first feature configured so as to indicate directionality with respect to the first feature.

10. The computing device of claim 1, wherein the first and second side features start include protruding ridges or recessed depressions.

11. A head-wearable display device, comprising:
    a trackpad positioned on the display device and configured to generate a signal generated by a touch point on the trackpad, wherein the trackpad comprises a touch-sensitive surface having a touch-detectable pattern, wherein the touch-detectable pattern comprises:
      a first feature; and
      a second feature having first and second side features, wherein the first and second side features start in proximity of the first feature and are positioned on opposite sides of the first feature;

a processor coupled to the trackpad; and a memory unit for storing program instructions executable by the processor to determine a location of the touch point on the trackpad based on the generated signal.

12. The head-wearable display device of claim 11, further comprising a display unit.

13. The head-wearable display device of claim 11, wherein a portion of the touch-sensitive surface that surrounds the touch-detectable pattern is formed of a smooth material.

14. The head-wearable display device of claim 11, wherein the touch-detectable pattern comprises a textured surface.

15. The head-wearable display device of claim 11, wherein the first feature of the touch-detectable pattern comprises a first textured surface, and the second feature of the touch-detectable pattern comprises a second textured surface.

16. The head-wearable display device of claim 11, wherein the first feature is substantially centrally located on the touch sensitive surface.

17. The head-wearable display device of claim 11, wherein the first feature includes a substantially smooth surface.

18. The head-wearable display device of claim 11, wherein the first and second side features include a rubberized surface.

19. The head-wearable display device of claim 11, wherein the first and second side features start in proximity of the first feature and change progressively along a respective direction away from the first feature configured so as to indicate directionality with respect to the first feature.

20. The head-wearable display device of claim 11, wherein the first and second side features include protruding ridges or recessed depressions.

\* \* \* \* \*